United States Patent [19]

Zanetos et al.

[11] Patent Number: 5,033,947
[45] Date of Patent: Jul. 23, 1991

[54] CHOCOLATE SHAPE MOLD ASSEMBLY

[75] Inventors: Tom Zanetos; Joseph C. Zanetos, both of Columbus, Ohio

[73] Assignee: Anthony-Thomas Candy Company, Inc., Columbus, Ohio

[21] Appl. No.: 519,866

[22] Filed: May 7, 1990

Related U.S. Application Data

[63] Continuation-in-part of Ser. No. 366,670, Jun. 15, 1989, Pat. No. 4,950,145.

[51] Int. Cl.⁵ .............................................. B29C 45/66
[52] U.S. Cl. ........................................ 425/3; 249/102; 249/168; 425/595
[58] Field of Search ............... 425/3, 140, 145, 135, 425/256, 259, 261, 170, 172, 150, 574, 575, 588, 595; 264/40.1, 40.2, 297.1, 297.2, 297.3, 297.6, 297.7; 249/168, 102

[56] References Cited

U.S. PATENT DOCUMENTS

| | | | |
|---|---|---|---|
| 3,326,142 | 6/1967 | Town | 425/357 |
| 3,545,044 | 12/1970 | Rebovich et al. | 425/3 |
| 3,550,648 | 12/1970 | Tabor et al. | 141/99 |
| 3,677,681 | 7/1972 | Zippel et al. | 425/145 |
| 4,142,847 | 3/1979 | Ripani | 425/140 |
| 4,505,311 | 3/1985 | Kramer et al. | 141/129 |
| 4,720,253 | 1/1988 | Koentges | 425/145 |
| 4,747,766 | 5/1988 | Van Meulenbeke | 425/159 |
| 4,756,861 | 7/1988 | Schultz | 425/3 |
| 4,808,078 | 2/1989 | Havens et al. | 417/38 |
| 4,812,268 | 3/1989 | Kamiguchi et al. | 425/135 |
| 4,950,145 | 8/1990 | Zanetos et al. | 425/140 |

Primary Examiner—Timothy Heitbrink
Attorney, Agent, or Firm—Watkins, Dunbar & Pollick

[57] ABSTRACT

A mold assembly for forming solid molded chocolate shapes is formed from first and second sheet-like mold halves separably joined by permanent magnets and having base flanges that support the mold assembly in an upright position for filling through an edge fill opening. The base flanges for the mold assembly include binary-coded mold fill information utilized in chocolate shape production apparatus and specific to that particular mold assembly.

6 Claims, 3 Drawing Sheets

CHOCOLATE SHAPE MOLD ASSEMBLY

CROSS-REFERENCE

This application is a continuation-in-part of U.S. patent application Ser. No. 07/366,670, filed June 15, 1989 now U.S. Pat. No. 4,950,145.

FIELD OF INVENTION

The present invention relates generally to molding chocolate, and particularly concerns a mold assembly for forming solid molded chocolate shapes.

BACKGROUND OF THE INVENTION

Chocolate mold filling apparatus may generally be classified into two types on the basis of production quantity and product variety requirements. A common general-purpose type of chocolate mold filling apparatus selectively and repeatedly pumps an individually-metered adjusted quantity of tempered chocolate from a storage tank to a fill nozzle and into a hand-moved chocolate mold aligned with the fill nozzle. No attempts are made to automatically adjust fill tubes heights or fill quantities or to mechanically control mold lateral or longitudinal movements. Hence, such general-purpose mold filling apparatus is well-suited only to a relatively small or hand-production run even though a variety of different chocolate mold sizes can be accommodated.

The common special-purpose type of mold filling apparatus, on the other hand, generally is designed and operated to produce only a single product in quantity and cannot readily accommodate intermediate to large production runs involving different mold sizes and mold cavity spacings.

The teachings of U.S. Pat. No. 3,326,142 issued to Town are representative of the type of mold filling apparatus provided for meeting long-run production requirements based on a single chocolate product. The teachings of U.S. Pat. No. 4,142,847 to Ripani also relate to the same category of chocolate mold filling apparatus.

U.S. Pat. No. 4,747,766 discloses a chocolate mold filling apparatus that utilizes pump reversal to retain in the apparatus fill nozzles chocolate that would otherwise undesireably drip from the fill nozzles. See Also U.S. Pat. No. 4,812,268 to Kamiguchi, et. al. and U.S. Pat. No. 4,808,078 to Havens, et. al. for other examples of the use of momentary pump reversal to prevent dripping action.

U.S. Pat. Nos. 3,677,681 to Zippel, et. al. and 4,720,253 to Koetges teach the use, respectively, of optical pattern and coded plug mold attachments for controlling mold filling parameters in a production process. None of the controlled process parameters, for instance, relate to or address the problems of using molds of different heights and different mold cavity spacings.

To overcome the lack of chocolate mold filling apparatus suitable for moderate production runs involving molds of different sizes, different mold cavity spacings, and different chocolate fill requirements we have invented an improved chocolate shape mold assembly that obtains important mold filling advantages over the known prior art.

SUMMARY OF THE INVENTION

The improved chocolate shape mold assembly of this invention utilizes joined mold halves which are each generally vertically oriented and which are supported in their upright position by base flanges integral with the mold assembly magnetically-clamped mold halves. Each base flange incorporates a code word binary form which programs, in a cooperating programmable controller, the height of the mold assembly cavity openings relative to the mold assembly base, the number and longitudinal spacing of the cavities in the mold assembly, and the quantity of tempered chocolate required for each mold assembly cavity.

DETAILED DESCRIPTION

Figure 1:
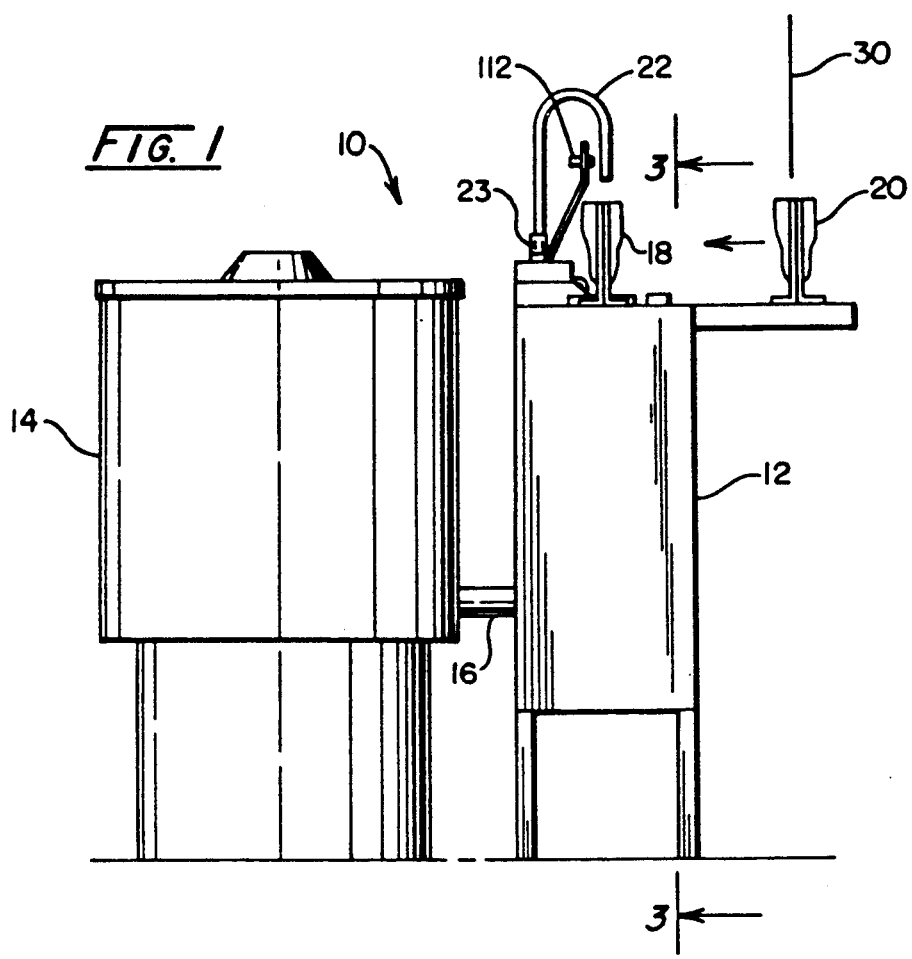
FIG. 1 is an end elevational view of the mold filling apparatus of this invention.
Figure 2:
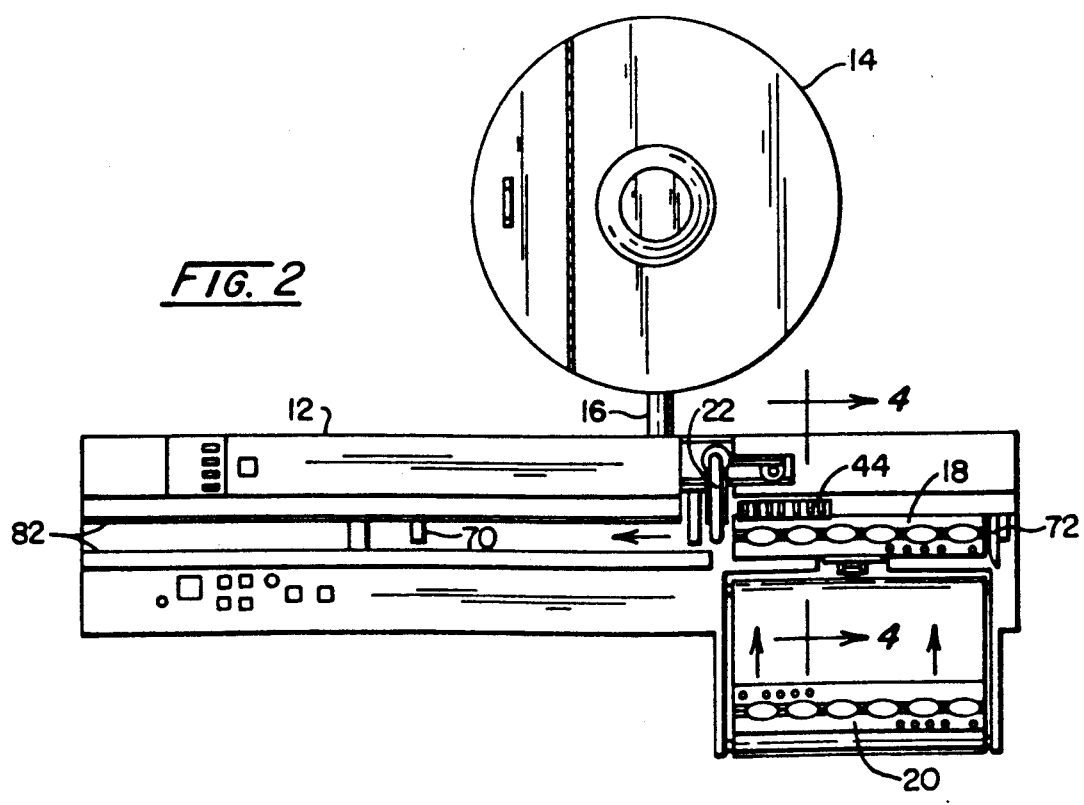
FIG. 2 is a top plan view of the apparatus illustrated in FIG. 1.

FIG. 1 illustrates a preferred embodiment of the mold filling apparatus 10 of our invention. Apparatus 10 includes a mold processing assembly 12 that is provided with tempered molding chocolate from tank 14 through the insulated connecting line 16 and that functions to automatically fill vertically split and upright chocolate molds 18, and 20. Storage tank 14 normally is water-jacketed, has a thermostatically-controlled electrical resistance heater that maintains the contained tempered molding chocolate at a temperature in the range of 88°–90° F., and also typically includes a continuously-operated chocolate mixture stirrer. Also, and not shown, a separate central storage tank and supply line arrangement is normally utilized in a typical chocolate molding production facility to continuously provide heated molding chocolate to tank 14. Storage tank 14 is preferably located adjacent assembly 12 so that the cover of tank 14 can be opened or removed and the fill tube 22 of assembly can be rotated, either automatically or manually, about its vertical axis and a quick-disconnect coupling 23 to a position over tank 14 that chocolate in assembly 12 can be recirculated into tank 12 intermittently when prolonged mold non-filling periods are encountered. The principal mechanical and control components of apparatus 10 are contained within the apparatus enclosure and are illustrated in greater detail in FIG. 3.

Figure 5:
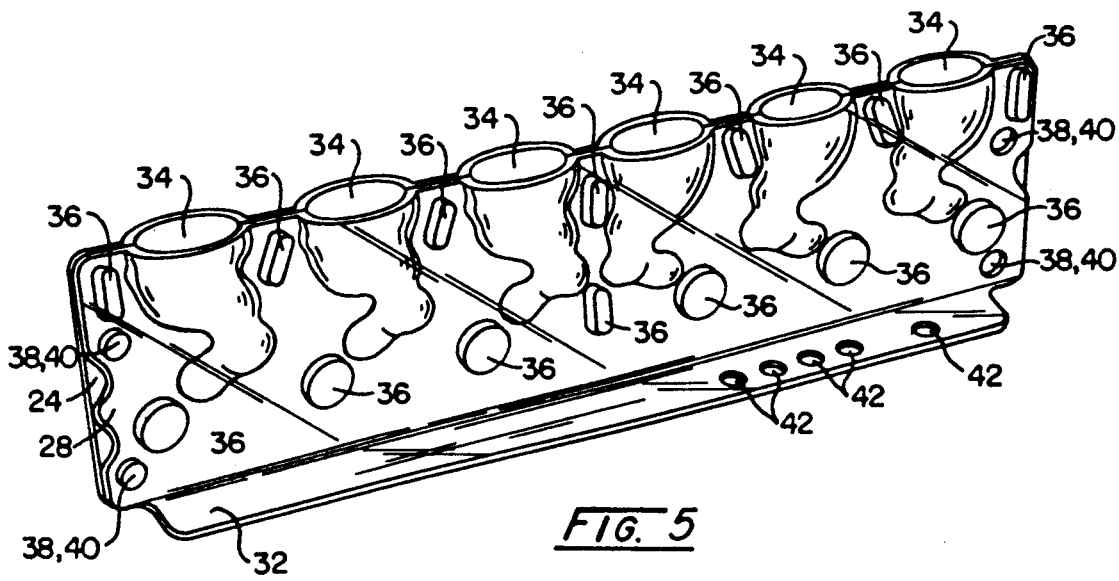
FIG. 5 is a perspective view of the split and flanged mold assembly utilized in connection with the apparatus of FIGS. 1 through 4.

The preferred mold 18, etc. used in connection with apparatus 10 is illustrated in greater detail in FIG. 5. Basically, each mold assembly 18, and 20 is comprised of a joined pair of molded polycarbonate mold halves 24, 28 which interface at a generally vertical plane 30 (FIG. 1). Each mold half 24, 28 is provided with an attached base flange 32 that functions as a support for mold 18 when the assembled mold is placed in its normal upright position. Mold 18 is typically provided with from one to as many as six or more chocolate mold cavities 34 arranged so that their inlet openings are generally in a horizontal plane at the top of the mold assembly. Each mold half is further conventionally provided with embedded permanent magnets 36 that cooperate with like positioned and embedded magnets in the opposite mold half to obtain a mold clampings objective upon mold assembly, yet the mold halves may be readily separated for product removal purposes. Also, mold halves 24, 28 are each provided with suitable interior bosses and conjugate recesses 38, 40 to aid in proper location of the mold halves relative to each other at the time of mold assembly and of clamping by permanent magnets 36.

Most importantly, each mold flange 32 is in essence provided with process information necessary for apparatus 10 to automatically control the filling of successive mold cavities 34 in successive molds 18, 20 which molds may not be alike as to height, number of cavities, cavity spacing, and cavity configuration that determines the quantity of chocolate required in each cavity for mold filling. In one actual embodiment of our invention we encoded the necessary process control information using "flange-stored" command words comprised of seven binary bytes or bits, thus permitting as many as $2^7$ or 128 different commands or configurations for inputting as many as 128 different control programs or features to the apparatus programmable controller 50. In such actual apparatus embodiment the coded information was "stored" in the mold flange in binary form by the presence or absence of seven localized and related mold flange surface areas capable of reflecting infra-red light. (The absence of a reflective surface in the mold flange was achieved by providing a hole 42 located to be in registration with its appropriate read bit sensor 44 when the mold was properly inserted into the assembly 12 for code reading and subsequent automatic filling. With reference to FIG. 5, five different properly spaced holes 42 are provided in flange 32 to obtain five of the code "0" bits when read; the remaining two bits of the coded command word were "1" bits and were developed by infra-red light emitted from the read sensor bank being reflected from the upper surface of mold flange 32 to the receiver of the read sensor 44 registered with the reflective surface through an optical fiber cable 46.)

Figure 3:
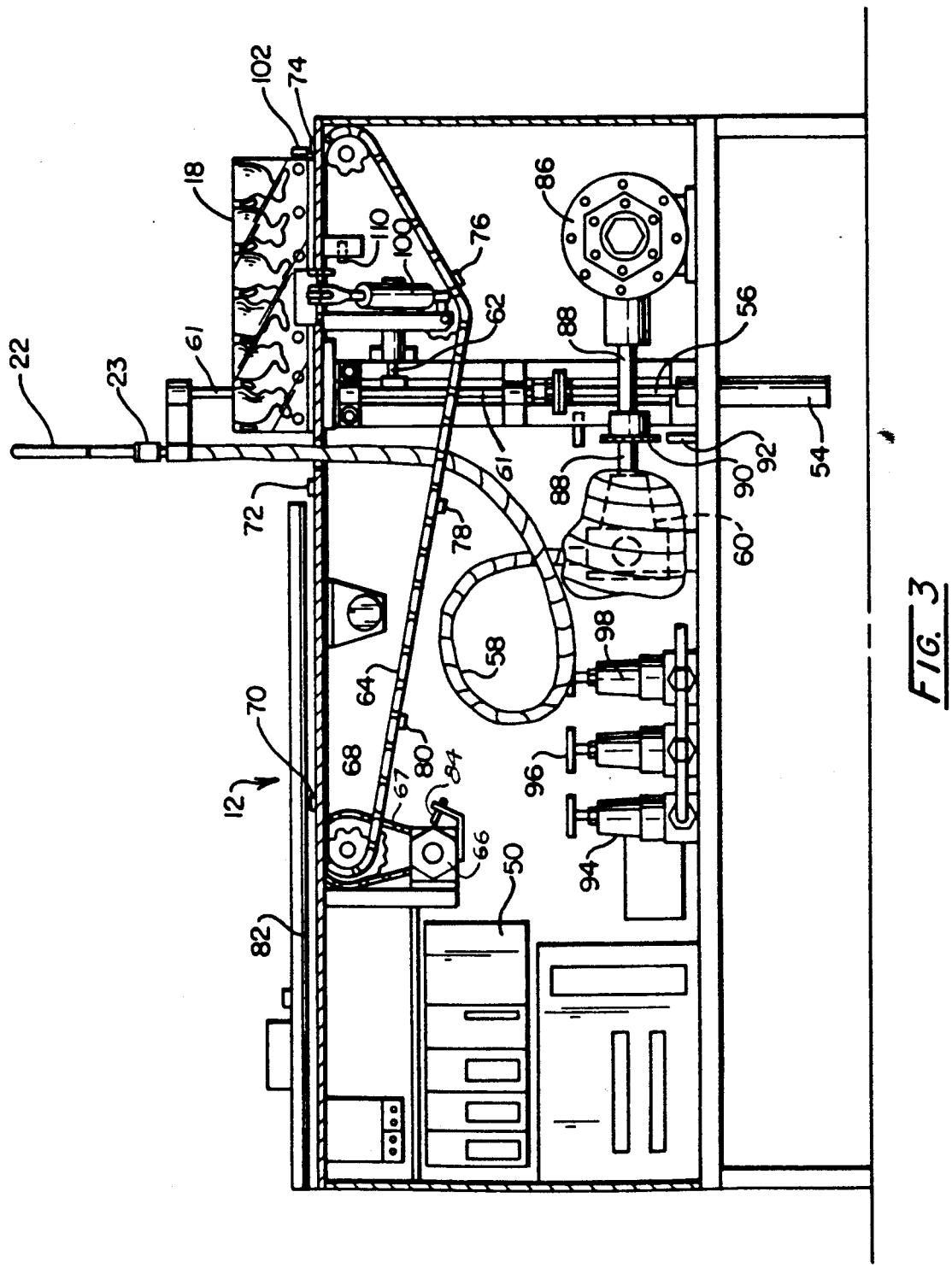
FIG. 3 is a front elevational view of the apparatus of FIGS. 1 and 2.

The particular code work incorporated into mold flange 32 in binary form and read by sensor bank 44 is inputted to the conventional programmable controller 50 incorporated in assembly 12 (FIG. 3). As previously indicated, the code work read by sensor bank 44 from each cooperating mold flange has a specific program that commands: (1) adjusting the vertical position of fill tube 22 to that height required by the mold cavities 34; (2) advancing the mold longitudinally to the first proper mold cavity/fill tube alignment; (3) pumping the quantity of tempered chocolate required by the mold cavity from tank 14 into the mold; (4) repeating steps (2) and (3) as many times as necessary to fill all the cavities of the mold; and (5) advancing the completely filled mold further until the mold has cleared the filling station and the cycle is ended. In addition, sensor bank 44 also initially "reads" the continuous mold edge outboard of holes 42 to generate a code word comprised of seven "1" bits that is programmed to cause movement of the mold assembly to a code read position. In the previously referred to actual embodiment of the present invention, the programmable controller utilized was a General Electric Company Series 1-Plus Programmable Controller that was programmed to command, for each different mold and incorporated 7-bit code word: one of five different fill tube heights; the required successive longitudinal fill positions for the mold cavities to a ¼ inch increment over a range of approximately 15 inches (60 stops); the required tempered chocolate fill quantities (usually identical values in the same mold) in 16 different weights varying from approximately 1 ounce to 16 ounces; and advancing the mold to the end of the fill cycle.

The functions controlled by controller 50 are carried out by the varus assembly elements illustrated in FIG. 3. Fill tube height adjustments are accomplished by operation of air cylinder 54 whose actuating rod 56 is mechanically coupled to fill tube 22. An insulated and electrically flexible fill hose 58 connects fill tube 22 to the insulated and heated gear pump 60 which delivers tempered chocolate from insulated connecting line 16 to the hose 58/tube 22 combination. Position feedback information relating to the actual adjusted height of tube 22 is developed in controller as a pulse count using the pulse outputs of conventional inductive proximity sensor 62. Sensor 60 detects passing, properly spaced, ferrous bolt heads (not shown) fixed in a vertically spaced-apart mold height relation on the bar 61 that connects actuator rod 56 to fill tube 22.

Longitudinal movement of each mold to be filled in assembly 12 is accomplished by endless conveyor chain 64 that is rotated by air motor 66 through reduction gears 68. Spaced conveyor flights 70 through 80 successively engage the trailing edges of mold assemblies 18, 20, etc. to move the mold assemblies longitudinally in the guide track 82 provided at the upper surface of assembly 12. Position feed-back information relating to the stop positions of chain 64/flight 70, etc. combinations are developed as a pulse count using a conventional inductive proximity sensor 84 that detects the individual teeth of a sprocket (not shown) attached to the shaft of air motor 66 and engaged by a chain 67 with reduction gear assembly 68. (Actual accumulation or "counting" or rotation feedback pulses is accomplished within controller 50 in a conventional manner. Basically, the sprocket gear tooth count is related to the previously described 60 different stop positions provided in ¼ inch increments over a 16 inch range.

Quantity control of chocolate fill through fill tube 22 is achieved by valve operation and controlled rotation of gear pump 60 for metering purposes. Gear pump 60 is driven by conventional air motor 86 through a shaft 88 that connects motor 86 to pump 60. A control sprocket 90 is mounted on the shaft and the illustrated inductive proximity sensor 92 is positioned to detect individual teeth on sprocket 90 for quantity control feedback purposes. In the previously referred to invention actual embodiment a pulse count range of 10 to 220 pulses was utilized in programming control 50 to select any one of 16 different tempered chocolate weights ranging from 1 ounce to 16 ounces.

Figure 4:
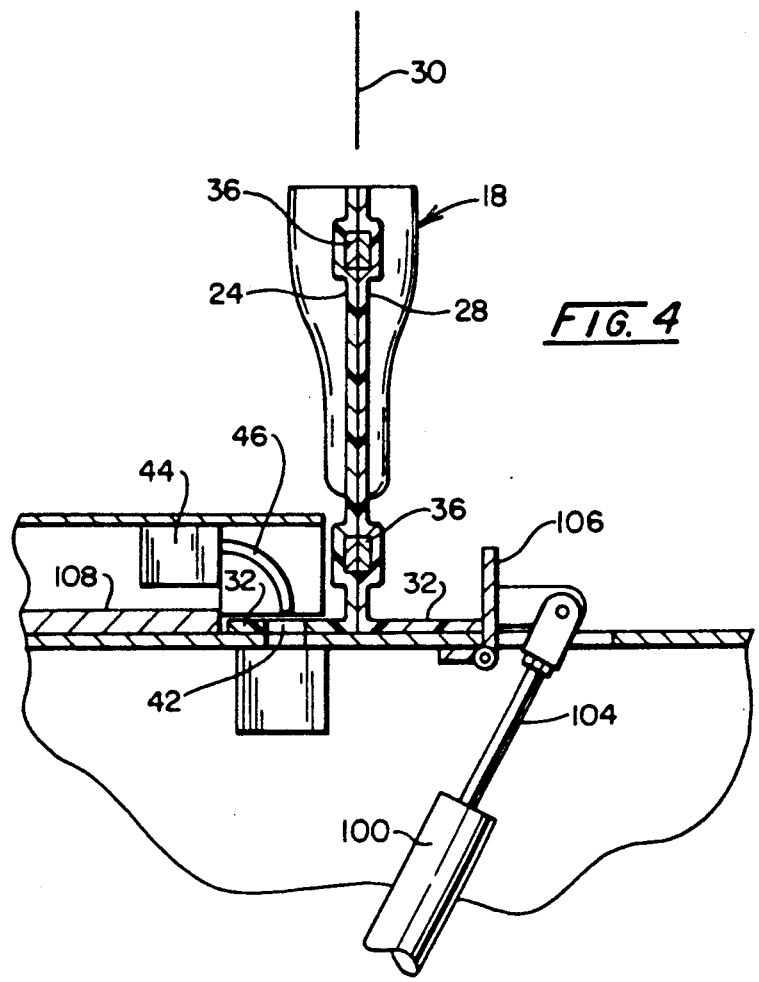
FIG. 4 is a detailed side elevational view of a mold locating mechanism illustrated in FIG. 3.

Adjustable air pressure regulators 94, 96, and 98 are incorporated in apparatus 10 to control the air supply line pressure actually developed for air motors 66 and 86 and to such peripheral elements as air cylinder 54 and air cylinder 100 (FIG. 4).

FIG. 4 more completely illustrates the mechanism provided in assembly 12 to effect proper positioning of each mold relative to sensor bank 44 for reading the code word stored in mold flanges 32. Proper insertion of mold 18 into the conveyor chain path laterally is guided in part by fixed stop 102. When sensor bank 44 first "reads" the solid (non-perforated) edge of flange 32 outboard of holes or openings 42, a 7-bit command word comprised of seven "1" bits generated and programmable controller 50, after a short time delay (e.g., 2 seconds), actuates air cylinder 100. Extension of the cylinder rod 104 rotates a connected hinged plate 106 upwards (counter-clockwise, FIG. 4) moving the edge of leading mold flange 32 toward stop 108. A properly positioned inductive proximity sensor 110 (FIG. 3) detects an arm (not shown) attached to and projecting from hinged plate 106 when the leading mold flange 32 is in proper position for code word reading by optical cables 46 and sensor bank 44.

It should be noted that the sensor bank 44 preferred for practice of our invention is comprised of a series of joined convention individual emitter/receiver components that generate infra red light and, as appropriate, receive that light as reflected from the upper surface of mold flange 32 to generate "1" bits in the command work. The emitter/receiver components are each optically connected to a bifurcated fiber optic cable 46 that terminates at its open end at a position immediately above the upper surface of mold flange 32. When a mold flange opening 42 registers with the position of an end of optical cable 46, not infra-red light is reflected to the cable and a command work "0" bit signal results. If an opening is not provided in flange 32 at the proper bit position, infra-red light from the bifurcated optical cable is reflected to the sensor receiver and "1" bit is generated. As previously indicated, in the referred-to actual embodiment of our mold filling apparatus, we have utilized a sensor bank 44 comprised of seven adjoining infra-red emmiter/receiver units to generate a total of an many as 128 different binary command words.

Inductive proximity sensor 112 (FIG. 1) is provided in mold processing assembly 12 in a position that detects the presence of fill tube 22 when its delivery end is properly located for mold filling. The output of sensor 110 serves as an interlock for proper operation of controller 50.

Also, we prefer that controller 50 be programmed to reverse the direction of rotation of gear pump 60 following the completion of each mold cavity fill step for a limited degree to prevent tempered chocolate remaining in fill tube 22 from dripping from the fill tube delivery opening. Usually such may be accomplished using a pulse count generated by proximity sensor 92.

Although not shown in the drawings, an additional inductive proximity sensor is properly positioned in assembly 12 in the path of conveyer chain 64 and flights 70 through 80 to detect when a cooperating mold 18, 20 have been moved to a position indicating completion of the fill cycle. Such is preferably accomplished by detecting the presence of the cooperating conveyor flight. The cycle completion signal is also utilized to "erase" the just completed program form the controller and ready the controller for accepting the next code word read by sensor bank 44.

Other features may be provided in apparatus 10 and do not comprise a part of the present invention. For instance, controls may be incorporated to permit manual rather than automatic operation of the illustrated and described mechanical elements. Also, the apparatus may be provided with a selectively operable vibrator mechanism that functions to vibrate molds 18, 20, etc. during mold filling steps. Similarly, fill and pause features may be incorporated into the program commanded by controller 50 in response to particular inputted code words.

It is herein understood that although the present invention has been specifically disclosed with the preferred embodiments and examples, modifications and variations of the concepts herein disclosed may be resorted to be those skilled in the art. Such modifications and variations are considered to be within the scope of the invention and the appended claims.

We claim:

1. A mold assembly for use in forming a solid molded chocolate shape, said mold assembly comprising:
   a) first and second mold halves, each mold half having a parting face and at least one mold cavity part therein;
   b) permanent magnet means joining said mold half parting faces together in contacting relation to form at least one completely formed mold cavity;
   c) mold assembly support means joined to said mold halves to support said mold assembly; and
   d) a coded binary form mold cavity fill instruction word contained in said mold assembly support means, said coded binary form mold cavity fill instruction word being readable by a programmable mold filling apparatus as reflected infra-red light and non-reflected infra-red light.

2. The mold assembly defined by claim 1 wherein said mold assembly support means is comprised of base flange means, said base flange means providing support to said mold halves when said mold halves are joined by said permanent magnet means and positioned with said mold half parting faces oriented in a generally vertical plane, said coded binary form mold cavity fill instruction word being contained in said base flange means.

3. The mold assembly defined by claim 1 wherein said at least one completely formed mold cavity has an internal volume, said coded binary form mold cavity fill instruction word being coded to contain said mold cavity relative location and said mold cavity internal volume.

4. The mold assembly defined by claim 2 wherein said base flange means is further comprised of mold end edges, and wherein said base flange means projects outwardly from each side of said joined mold halves parting faces to said mold end edges, said coded binary form mold cavity fill instruction word being contained in said base flange means a repeated distance from each of said mold end edges and a repeated distance from said joined mold halves parting faces.

5. The mold assembly defined by claim 1 wherein said mold assembly support means has a light-reflecting area and a light non-reflecting area, said coded binary form mold cavity fill instruction word being comprised at least in part of said light-reflecting area and said light non-reflecting area.

6. The mold assembly defined by claim 5 wherein said mold assembly support means has an opening therethrough, said opening comprising said light non-reflecting area and at least a part of said coded binary form mold cavity fill instruction word.

* * * * *